July 9, 1963

R. F. SNYDER 3,096,919

WEB GUIDE

Filed Aug. 14, 1961

*INVENTOR.*
ROBERT F. SNYDER

BY

*J.B. Holden*
ATTORNEY

July 9, 1963    R. F. SNYDER    3,096,919
WEB GUIDE
Filed Aug. 14, 1961    3 Sheets-Sheet 2
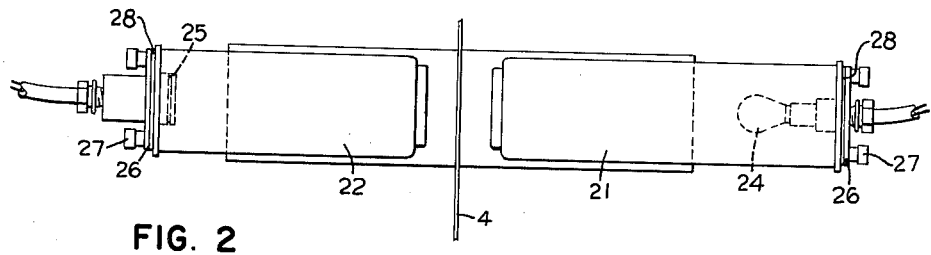
FIG. 2
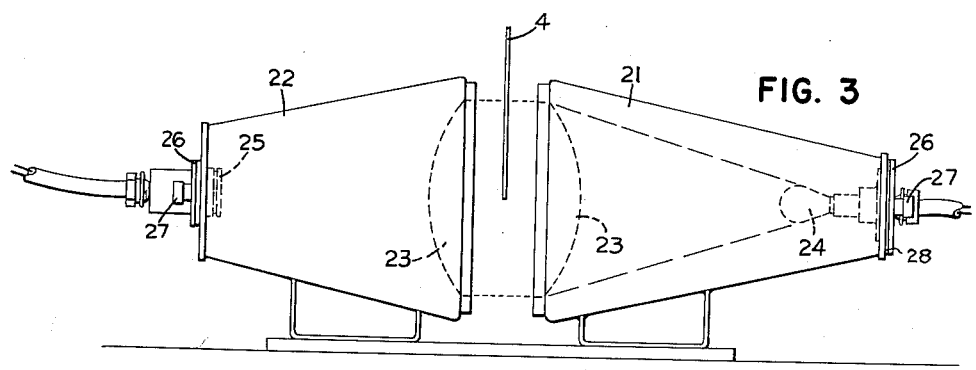
FIG. 3
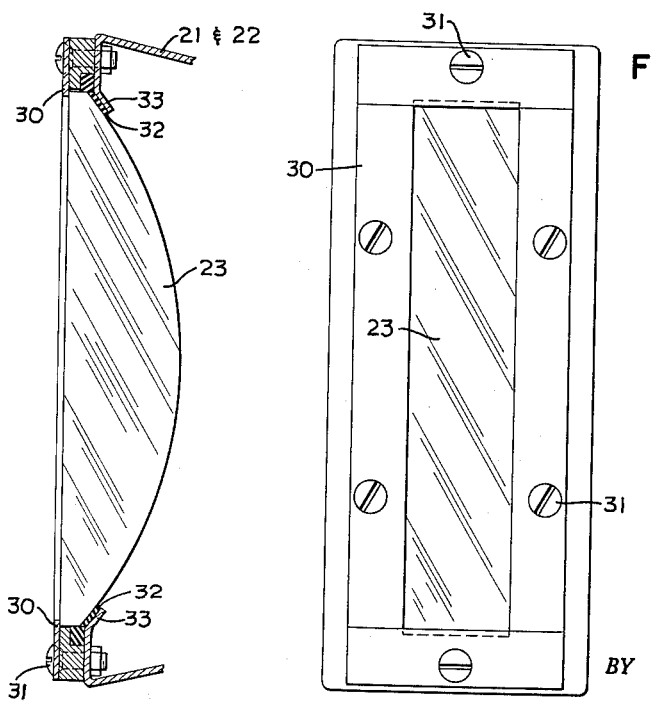
FIG. 4
FIG. 5
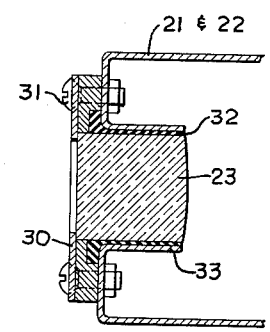
FIG. 6
INVENTOR.
ROBERT F. SNYDER
BY
*J. B. Holden*
ATTORNEY July 9, 1963
R. F. SNYDER
3,096,919
WEB GUIDE
Filed Aug. 14, 1961
3 Sheets-Sheet 3
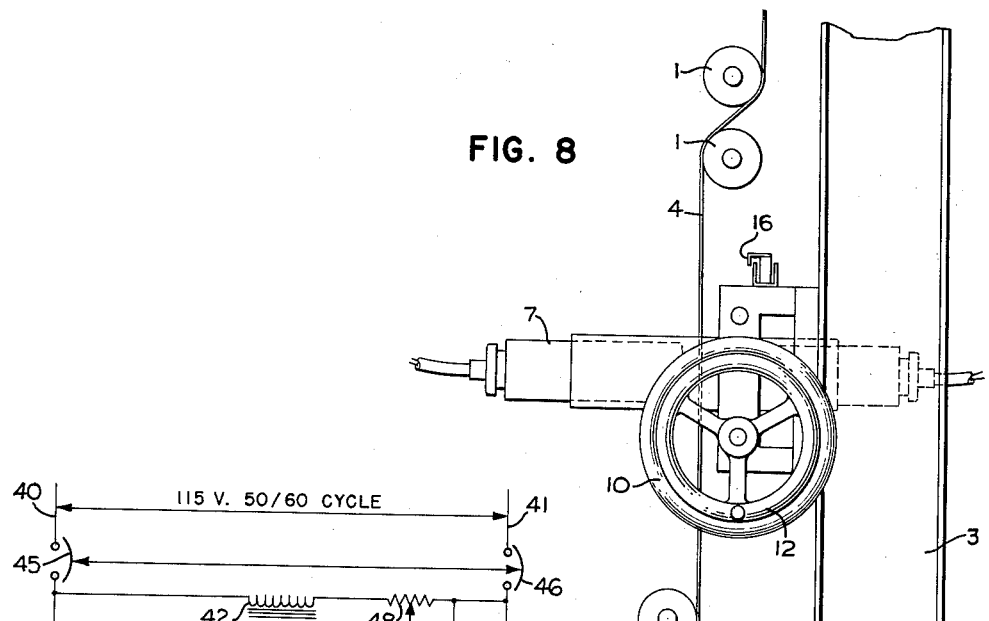
FIG. 8
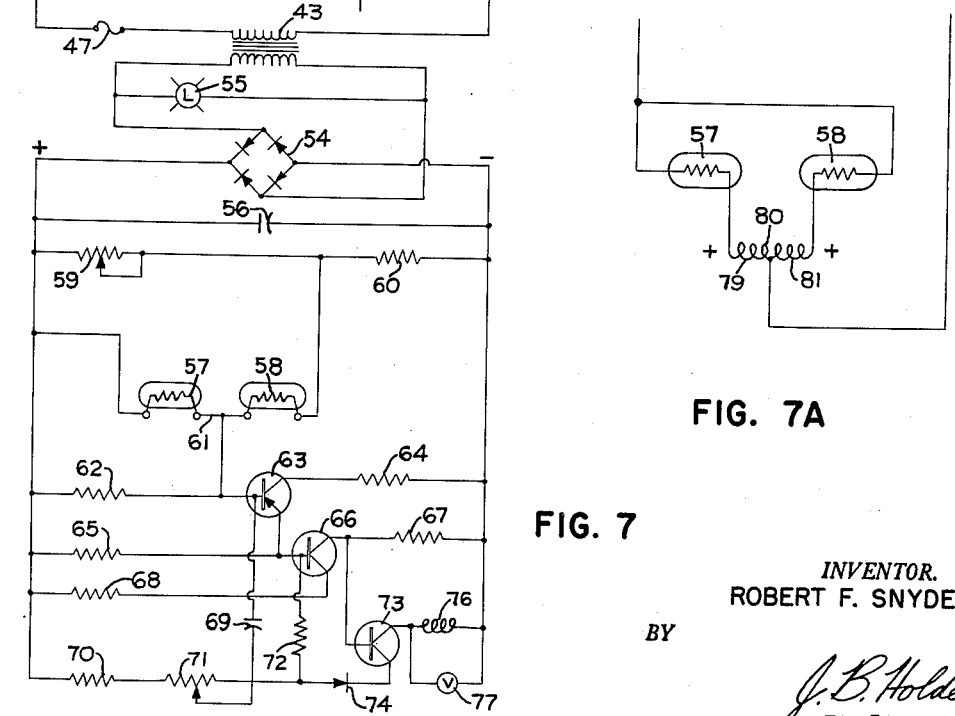
FIG. 7A
FIG. 7
INVENTOR.
ROBERT F. SNYDER
BY
J. B. Holden
ATTORNEY

United States Patent Office 3,096,919
Patented July 9, 1963

3,096,919
WEB GUIDE
Robert F. Snyder, Lakemore, Ohio, assignor to The Goodyear Tire & Rubber Company, Akron, Ohio, a corporation of Ohio
Filed Aug. 14, 1961, Ser. No. 131,345
7 Claims. (Cl. 226—3)

This invention relates to a mechanism for guiding moving webs and in particular to a photoelectric edge sensing and web centering system.

It is well-known in the art to sense the position of the edges of a moving web by a variety of mechanical, pneumatic and electric means and to control the centering of the web, for example, a calender, in accordance with the output of the particular edge sensors. In many instances, the use of contact type sensors must be avoided in order to minimize damage to the particular web being processed. In other instances, pneumatic sensors using, for example, air jets, are impractical or in some cases overly sensitive to web position changes. Photoelectric edge sensors proposed in the past, while in many instances quite adequate, have not proven to be satisfactory in the processing of certain types of webs wherein extremely high speed travel or very accurate centering is required, since they tend to end in overcorrection in a system wherein wide fluctuations of the web edge position are encountered.

It is an object of the present invention to provide an edge sensing system in which maximum accuracy is achieved.

It is an additional object of the present invention to provide a photoelectric edge sensing system in which the tendency to overcorrect is minimized.

It is a further object of the present invention to provide a photoelectric edge sensing and centerline control system capable of handling a variety of webs of different types and of widely varying edge positions.

These and other objects of the invention will become apparent from the following description and drawings in which, FIG. 1 is a partial plan view of the sensing and control portion of a web processing machine such as a calender;

FIG. 2 is a plan view of a photoelectric sensing unit of the present invention;

FIG. 3 is a side view of the unit shown in FIG. 2;

FIG. 4 is a side view of a lens used in the present invention;

FIG. 5 is an end view of the lens shown in FIG. 4;

FIG. 6 is a partial view of the sensing portion of the unit shown in FIG. 2;

FIG. 7 is an electrical schematic of the sensing and control circuit utilized in the present invention;

FIG. 7A is a modified portion of the circuit of FIG. 7; and

FIG. 8 is an end elevation view of a typical calender showing a portion of the mechanical adjusting mechanism associated with the sensing units.

Figure 1:
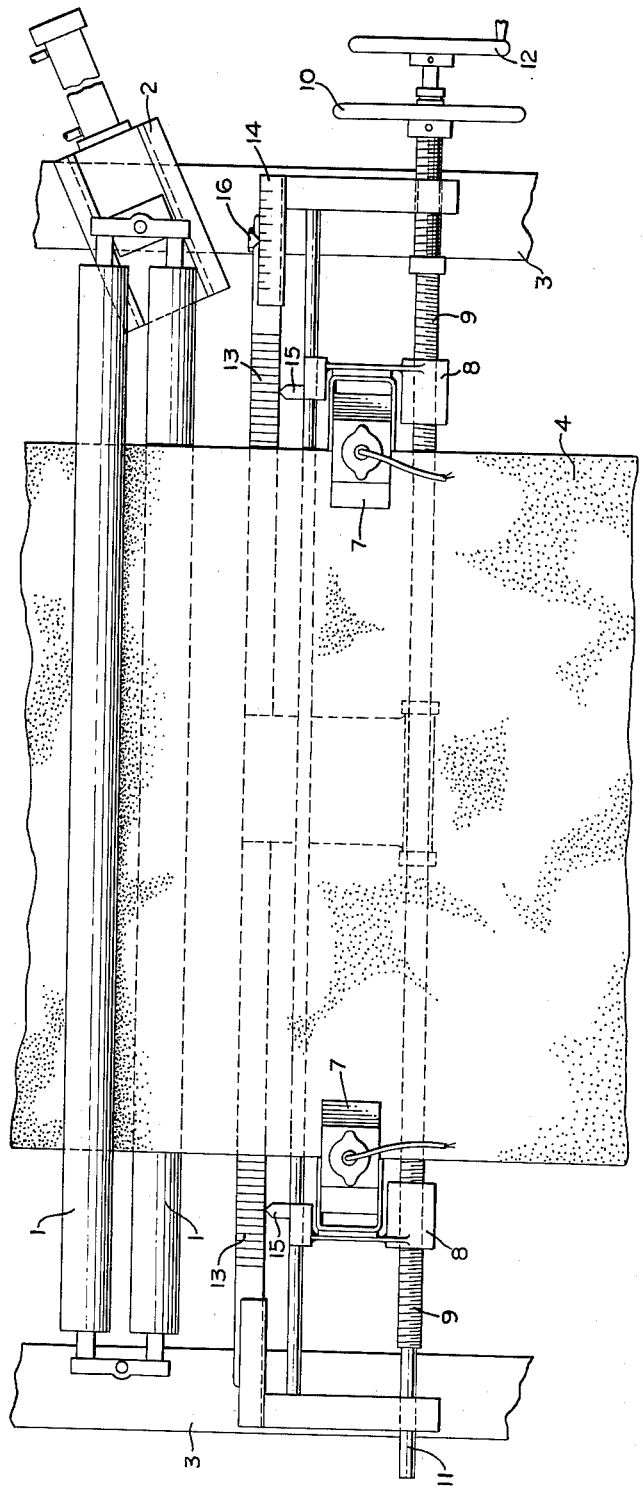

As previously mentioned, edge sensing devices proposed in the past for use with high speed calendering equipment have not been satisfactory. One of the major problems has been the tendency for the sensors to be overly sensitive to web position changes, particularly where edge positions vary widely, in that the systems were of such a nature as to be either all on or all off. Under such conditions, the signal indicating a need for repositioning the web tended to vary from extreme to extreme and ofttimes resulted in an overcorrection in the system. The present invention successfully avoids many of the problems of the prior art systems and at the same time provides a very efficient, yet compact, sensing unit by utilizing a very wide beam transversely positioned at each wedge edge. The variation in beam intensity is sensed on the other side of the web by a device which, while itself is relatively small in area, nonetheless "sees" the broad or wide area covered by the beam. This results in an extremely fine control through a system which is never, at least under expectable conditions, completely on or totally off. Furthermore, the system permits accurate calibration due to the wide beam system, since slight changes in the web position, while easily detected, do not result in wide variations in the signal received. The operation of the system of the present invention will be more easily appreciated from the following detailed description.

Referring to FIG. 1, a pair of tiltable rolls 1, hydraulically controlled by a conventional cylinder mechanism 2, are rotatably mounted in a conventional calender frame 3. A web 4 passes over the lower roll and under the upper roll, as may be more clearly seen in FIG. 8. Twin photosensor units 7, which are alike, are mounted on brackets 8 at each edge of web 4. The brackets 8 are mounted by means of an internally threaded channel to a threaded positioning rod 9. The threading of the channels and rod are such that rotation of the wheel 10 results in a closing or opening of the space between the units 7. A second rod 11 extends through rod 9 and is journaled in the calender frame. The rod 11 is bearinged to rod 9 and threadably journaled in the frame in such a fashion that rotation of positioning wheel 12 results in a lateral movement of the sensors either to left or right. Visual scales 13 and 14 are provided above the sensing units, which, through pointers 15 attached to the individual sensors and pointer 16 attached to rod 9, indicate the position of the entire assembly relative to the centerline of the calender and the lateral spacing between the sensors. With the mechanical adjustment described, webs of a variety of widths and positioned either left or right of the calender centerline may be accommodated.

The optical-photoelectric sensor units are shown in detail in FIGS. 2 through 6 and comprise a pair of closed, generally fan-shaped housings 21 and 22, each having a collimating lens 23 mounted in sealed condition at the larger end thereof. One of the housings, such as 21, has at the rearward end thereof a conventional, and as will later appear, relatively low intensity light source 24. The other contains at its rearward portion a photosensor device, preferably a photoconductive element 25, composed, for example, of cadmium sulfide. The light source and photosensing element receiving sockets 26 are mounted in place, for example, by screws 27 and sealed against dust and dirt by resilient grommets 28. In similar fashion, the collimating lenses 23 are held in place by a plate 30 pressed against the face of the lens by screws 31, in turn pressed against grommet 32 seated against the inwardly projecting lip 33 of the unit housing. The position of the sensor with respect to the web edge may be seen in FIG. 3 and the feature of the laterally expanded collimated light beam is apparent. With such an arrangement, it has been found that a very low intensity light source, even to the point that the filament glows no more than cherry red, may be used with excellent results. Furthermore, due to the spread of the collimated beam transversely of the web, a shift in web position in either direction, while resulting in an easily detectable signal, does not result in the web moving out of the area the sensor can see nor the complete covering of the sensible area. Thus, wide fluctuations in signal strength at the sensors is avoided, which in combination with the low intensity source, results not only in superior control but extended useful life of the source and sensor. In addition, through the use of the collimating lenses, parallax problems are avoided.

The electrical power supply and control circuitry used in the present invention are shown in FIG. 7. A power supply of preferably 115 v. A.C. is impressed across lines 40 and 41 which connect to transformers 42 and 43 and a pneumatic control lock-out solenoid coil 44. The usual circuit breakers 45 and 46 and fuse 47 provide overload protection in the circuit. A variable resistance 48 permits adjustment of the voltage across the primary of transformer 42. Transformer 42 steps the voltage down to approximately 11 volts to supply the power to low intensity light sources 49 and 50 used in the photosensing units previously described. A voltmeter 51 is connected across the secondary of transformer 42 to permit checking the power supplied to the light source. Transformer 43 supplies low voltage to the photosensor control circuit shown in the lower portion of FIG. 7. The output from the secondary of transformer 43 is connected across rectifying bridge 54 and across a power-on indicator light 55. A smoothing condenser 56 is connected across the bridge output which is connected to the twin photosensors 57 and 58 through bias resistor 59 and dropping resistor 60. The outputs of the photosensors 57 and 58 are presented in opposition or "bucked" through line 61 and may, if desired, be fed to a conventional three-stage transistor power amplifier comprising elements 62 through 74, the operation of which need not be explained in detail. Suffice it to say that amplifiers are conventional in the art and available commercially. The output of the power amplifier is fed to the solenoid control coil 76. A voltmeter 77 is connected across the control coil to permit visual checking of the output level of the amplifier to the coil. The coil 76 controls the actuation of a conventional hydraulic unit available, for example, from the General Precision Equipment Company, and known as an Askania unit. These commercially available controls act through the hydraulic actuator 2 shown in FIG. 1 to tilt the guide rolls to recenter the web in accordance with the signal produced by the control circuit in response to the error detected by the broad beam photounits previously described. The control or signal circuit may be further improved by elimination of the power amplifier shown in FIG. 7 and the use of the output from the sensors directly to a split winding control coil. Such arrangement avoids the drift inherent in transistor amplifiers and provides a direct polar sensitive control of the guide roll actuator. A modified portion of the circuit is shown in FIG. 7A, wherein the output of photosensors 57 and 58 is fed directly to the ends of split coil 79. The arms 80 and 81 of coil 79 are used as the windings on a permanent magnet pneumatic controller (not shown) and permit direct control through the output of the bucking photosensors 57 and 58.

While certain representative embodiments and details have been shown for the purpose of illustrating the invention, it will be apparent to those skilled in this art that various changes and modifications may be made therein without departing from the spirit or scope of the invention.

I claim:

1. A photo-responsive web edge sensing device comprising a light source, a collimating lens mounted remotely therefrom and forming an optical transmitting unit therewith, said lens having a substantially elongated transverse cross-section so that light passing therethrough is formed into a narrow, transversely elongated beam, a photo-responsive element, a concentrating lens mounted remotely therefrom and forming an optical receiving unit therewith, said lens having a substantially elongated transverse cross-section, said optical units adapted to be positioned adjacent the web edge to be sensed and on opposite sides thereof with the respective lenses being positioned adjacent to and facing each other with the elongated cross-section substantially transverse of the web.

2. A photo-responsive web edge sensing device comprising a low intensity light source, a collimating lens mounted remotely therefrom and forming an optical transmitting unit therewith, said lens having a substantially elongated transverse cross-section so that light passing therethrough is formed into a narrow, transversely elongated beam; a photo-responsive element adapted to develop an electrical signal when exposed to said light source, a concentrating lens mounted remotely therefrom and forming an optical receiving unit therewith, said lens having a substantially elongated transverse cross-section; said optical units adapted to be positioned adjacent a web edge and on opposite sides thereof with the lenses adjacent to and facing each other with the elongated cross-section substantially transverse of the web.

3. A photo-responsive web edge sensing and centerline control comprising a web edge sensing device disposed adjacent each edge of the web; said device including a light source, a collimating lens mounted remotely therefrom and forming an optical transmitting unit therewith, said lens having a substantially elongated transverse cross-section so that light passing therethrough is formed into a narrow, transversely elongated beam, a photo-responsive element adapted to develop an electrical signal when exposed to light, a concentrating lens mounted remotely therefrom and forming an optical receiving unit therewith, said lens having a substantially elongated transverse cross-section, said optical units being positioned adjacent the web edge and on opposite sides thereof with the respective lenses adjacent to and facing each other with the elongated cross-section substantially transverse of the web; means to compare the signals developed by said photo-responsive elements and thereby determine the position of the centerline of the web relative to the sensing devices, and means to adjust the position of the web relative to said devices according to predetermined criteria.

4. A photo-responsive web edge sensing and centerline control comprising a web edge sensing device disposed adjacent each edge of the web; said device including a low intensity light source, a collimating lens mounted remotely therefrom and forming an optical transmitting unit therewith, said lens having a substantially elongated transverse cross-section so that light passing therethrough is formed into a narrow, transversely elongated beam, a photo-responsive element adapted to develop an electrical signal when exposed to light, a concentrating lens mounted remotely therefrom and forming an optical receiving unit therewith, said lens having a substantially elongated transverse cross-section, said optical units being positioned adjacent the web edge and on opposite sides thereof with the respective lenses adjacent to and facing each other with the elongated cross-section substantially transverse of the web; means to compare the signals developed by said photo-responsive elements and thereby determine the position of the centerline of the web relative to the sensing devices, and means to adjust the position of the web relative to said devices according to predetermined criteria.

5. A method of determining the centerline position of a substantially light-impervious web comprising projecting a transversely elongated light beam transversely of the web and perpendicular to the plane thereof and intersecting each edge thereof, detecting the transmitted portion of said elongated light beam at each edge of the web, and comparing said detected transmitted portions to determine the relative edge position and hence the centerline of said web.

6. A method of determining the centerline position of a substantially light-impervious web comprising projecting a transversely elongated low intensity light beam transversely of the web and perpendicular to the plane thereof and intersecting each edge thereof, detecting the transmitted portion of said elongated low intensity light beam at each edge of the web, and comparing said detected transmitted portions to determine the relative edge positions and hence the centerline of said web.

7. A method of determining the centerline position of a substantially light-impervious web comprising projecting a transversely elongated low intensity collimated light beam transversely of the web and perpendicular to the plane thereof and intersecting each edge thereof, detecting the transmitted portion of said elongated low intensity collimated light beam at each edge of the web, and comparing said detected transmitted portions to determine the relative edge positions and hence the centerline of said web.

References Cited in the file of this patent
UNITED STATES PATENTS

| | | |
|---|---|---|
| 2,393,631 | Harrison et al. | Jan. 29, 1946 |
| 2,558,761 | Kentis | July 3, 1951 |
| 2,777,069 | Saeman | Jan. 8, 1957 |
| 2,842,361 | Miller | July 8, 1958 |
| 3,019,955 | Walthall | Feb. 6, 1962 |
| 3,024,955 | Powers | Mar. 13, 1962 |
| 3,067,646 | Reesen | Dec. 11, 1962 |